US009489015B2

(12) United States Patent
Gioscia et al.

(10) Patent No.: US 9,489,015 B2
(45) Date of Patent: Nov. 8, 2016

(54) COVER FOR A TABLET COMPUTING DEVICE HAVING RETAINING MECHANISMS (75) Inventors: Richard Gioscia, Santa Clara, CA (US); Philip Bryan, Menlo Park, CA (US); Michael Christian Ryner, Brentwood, CA (US); Giovanni Mata Magana, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 13/563,331

(22) Filed: Jul. 31, 2012

(65) Prior Publication Data

US 2014/0036438 A1 Feb. 6, 2014

(51) Int. Cl.
*G06F 1/16* (2006.01)
*A45C 11/00* (2006.01)

(52) U.S. Cl.
CPC ............. *G06F 1/1628* (2013.01); *A45C 11/00* (2013.01); *A45C 2011/003* (2013.01); *A45C 2200/15* (2013.01)

(58) Field of Classification Search
USPC ................ 335/219, 285, 302–306, 205–207; 439/38, 218, 217, 39; 24/303; 361/807, 361/679.01, 600; 206/45.2, 45.23, 45.24, 206/305, 320, 764, 765; 345/111
See application file for complete search history.

(56) References Cited

U.S. PATENT DOCUMENTS

| | | | |
|---|---|---|---|
| 6,829,140 B2 * | 12/2004 | Shimano et al. | ........ 361/679.09 |
| 7,735,644 B2 * | 6/2010 | Sirichai et al. | ............... 206/320 |
| 2008/0302687 A1 * | 12/2008 | Sirichai et al. | ............... 206/320 |
| 2009/0128785 A1 * | 5/2009 | Silverstein | .................... 353/119 |
| 2009/0159763 A1 * | 6/2009 | Kim | ............................. 248/174 |
| 2012/0037523 A1 * | 2/2012 | Diebel et al. | ................. 206/320 |
| 2012/0044638 A1 | 2/2012 | Mongan et al. | |
| 2012/0066865 A1 * | 3/2012 | Lauder et al. | ................... 16/382 |
| 2012/0068797 A1 * | 3/2012 | Lauder et al. | ................ 335/285 |
| 2012/0068798 A1 * | 3/2012 | Lauder et al. | ................ 335/306 |
| 2012/0068799 A1 * | 3/2012 | Lauder et al. | ................ 335/306 |
| 2012/0068942 A1 * | 3/2012 | Lauder et al. | ................ 345/173 |
| 2012/0069502 A1 * | 3/2012 | Lauder et al. | ........... 361/679.01 |
| 2012/0069503 A1 * | 3/2012 | Lauder et al. | ........... 361/679.01 |
| 2012/0069540 A1 * | 3/2012 | Lauder et al. | ................ 361/807 |
| 2012/0194308 A1 * | 8/2012 | Lauder et al. | ................ 335/219 |
| 2012/0194448 A1 * | 8/2012 | Rothkopf | ...................... 345/173 |
| 2012/0194997 A1 * | 8/2012 | Mcclure et al. | ......... 361/679.55 |
| 2012/0211377 A1 * | 8/2012 | Sajid | ............................ 206/216 |
| 2013/0027867 A1 * | 1/2013 | Lauder et al. | ........... 361/679.29 |
| 2013/0076614 A1 * | 3/2013 | Ive et al. | ..................... 345/156 |

* cited by examiner

Primary Examiner — Mohamad Musleh
(74) Attorney, Agent, or Firm — Mahamedi IP Law LLP

(57) ABSTRACT

A computing device accessory is provided. The computing device accessory includes a first cover segment that has an inner surface and an exterior surface. The interior surface includes a recessed region to receive a base of a tablet computing device. The computing device accessory also includes a magnetic component provided with the first cover segment, where the magnetic component is positioned to actively retain the tablet computing device when the base of the tablet computing device is received in the recessed region.

16 Claims, 7 Drawing Sheets

COVER FOR A TABLET COMPUTING DEVICE HAVING RETAINING MECHANISMS

BACKGROUND OF THE INVENTION

Tablet or slate-style computing devices are increasingly popular forms of computing devices. It is common for tablets to be accessorized with a variety of types of devices, including covers and docking stations.

DETAILED DESCRIPTION

Embodiments described herein include an accessory cover device that can be manipulated in multiple positions to support a computing device in multiple upright positions. In some examples, retention mechanisms, including magnetic coupling mechanisms, can be used to retain the computing device against the cover in the upright position and/or retain the cover device in a stable position to support the computing device.

In examples described herein, a cover for a computing device can include multiple cover segments that pivot to support a computing device in an upright position. In one example, first cover segment includes an inner surface to receive the computing device, and three panel segments or panels that make up a second cover segment. A first panel extends from the first cover segment and is structured to pivot relative to the first cover segment. A second panel extends from the first panel and is structured to pivot relative to the first panel, and a third panel extends from the second panel and is structured to pivot relative to the second panel. The three panels are pivotable relative to the first cover segment to form a first stable position for holding the first cover segment upright at a first orientation, and a second stable position for holding the first cover segment upright at a second orientation.

According to some embodiments, the cover can also include a first magnetic component that is disposed in the first cover segment, and a second magnetic component that is disposed in the third panel. The first and second magnetic components can be positioned and magnetically coupled to each other to actively maintain a first stable position or a second stable position, in which each stable position supports the computing device in an upright position. The exterior surface of the first cover segment can also include one or more raised regions or structures which support the third panel when the cover is positioned in the first stable position or the second stable position.

In some embodiments, the cover can also include retention features or mechanisms for enabling the computing device to be retained or held by the cover. The first cover segment of the cover can include an inner surface that has a recessed region for receiving at least a portion of the computing device. The computing device can be a tablet computing device that has a housing with a base segment and a display segment. The recessed region of the inner surface can retain the base segment of the tablet computing device (e.g., the base segment of the tablet computing device can be inserted into the recessed region) and the display segment can rest on the inner surface so that a peripheral thickness of the display segment can be exposed. The recessed region of the inner surface can provide retention of the tablet computing device in two directions.

Still further, in one or more embodiments, the cover can also include a set of magnetic components that are disposed in the first cover segment to magnetically couple to the base segment of the tablet computing device. The set of magnetic components can be positioned to actively retain the tablet computing device when the base segment of the tablet computing device is received in the recessed region of the inner surface. The set of magnetic components can provide retention of the tablet computing device in a third direction.

As used herein, the term "magnetic" (e.g., "magnet component") refers to magnets and materials that are attractive to magnets (e.g., iron, steel). Thus, in a magnetic coupling, for example, one magnetic component may be a magnet, and another magnetic component may be material that is attractive to magnets. In another example, both magnetic components may be magnets that each have a polarity to be attracted to each other.

The term "tablet computing device" or variants such as "tablet," "tablet device" or "tablet computer" means a computing device that has characteristic form-factor of being flat and display-dominant.

Figure 1A:
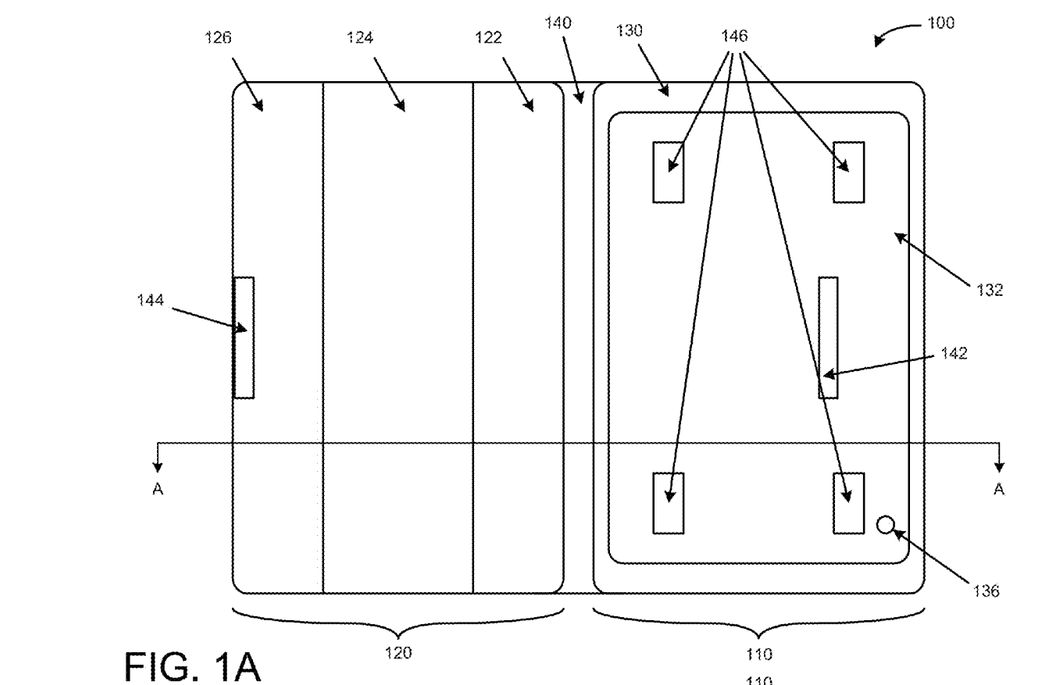
FIGS. 1A-1C illustrate an example cover for a computing device.
Figure 1B:
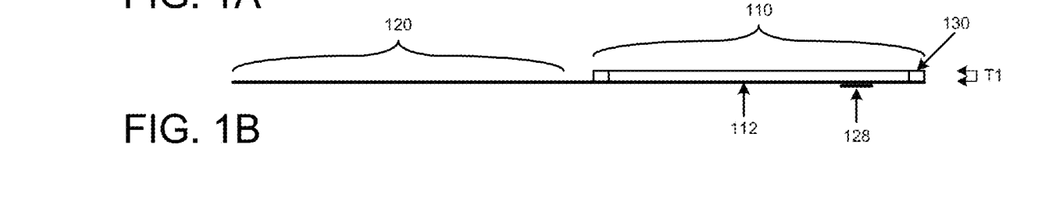
Figure 1C:
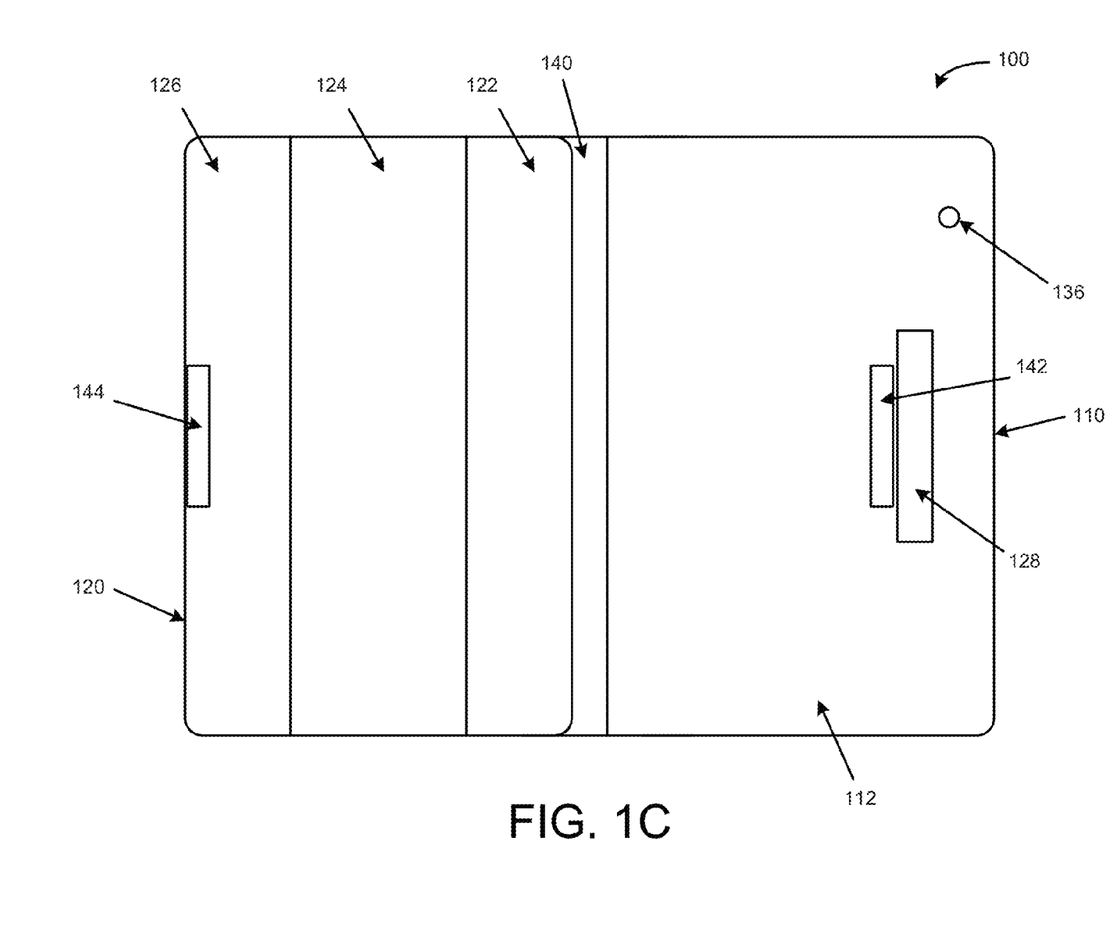

FIGS. 1A-1C illustrate an example cover for a computing device. Examples described below discuss primarily a tablet computing device, but other types of computing devices can be supported by the covers described herein. FIG. 1A illustrates a cover 100 that is in an open position. FIG. 1B illustrates an example cross sectional view of the cover 100 about the line A-A. FIG. 1C illustrates an example rear view of the cover 100 that is in an open position. The cover 100 can include a first cover segment 110 and a second cover segment 120 that is extended from the first cover segment 110. The cover 100 can also include a center portion 140 that can be a portion of either the first cover segment 110 and/or the second cover segment 120, or a separate portion, that enables the first cover segment 110 and the second segment 120 to pivot relative to each other. In variations, the center portion 140 of the cover 100 can be composed of more flexible material than that of the first cover segment 110.

The second cover segment 120 can be composed of multiple panels. For example, the second cover segment 120 can include three panels, a first panel 122, a second panel 124, and a third panel 126. Each of the three panels 122, 124, 126 can be structured to pivot relative to the adjacent panels. For example, the first panel 122 can be structured to pivot (e.g., at a bend, crease, or a hinge) relative to the first cover segment 110 (e.g., by itself or via the center portion 140), and the second panel 124 can be structured to pivot relative to the first panel 122. Similarly, the third panel 126 can also be structured to pivot relative to the second panel 124. Because the three panels 122, 124, 126 are pivotable relative to adjacent panels (or to an adjacent segment), the second cover segment 120 can be manipulated relative to the first cover segment 110 to form a first stable position for holding the first cover segment 110 upright at a first orientation or a second stable position for holding the first cover segment 110 upright at a second orientation.

As described herein, a first stable position and a second stable position of the cover 100 enables a display surface (e.g., a touch-sensitive display) of a tablet computing device that is engaged and retained by the cover 100 to be exposed to a user. In addition, the first stable position and the second stable position each enables the cover 100 and the retained tablet computing device to maintain a stable orientation when the cover 100 and the retained device is placed on a surface (e.g., a table top, or a user's lap), while at the same time, maintaining the positions even when a user operates the retained device and/or applies pressure or force on the cover 100 and/or the retained device (e.g., presses buttons or makes finger gestures on the display surface).

In one implementation, the cover 100 can include a first magnetic component 142 and a second magnetic component 144 that can enable the cover 100 to be actively maintained in the first stable position or the second stable position. As noted, a magnetic component can be a component that is magnetic, or that is attracted to a magnetic material. For example, the first magnetic component 142 can be a magnet (e.g., a flat magnet) that is disposed on or within the first cover segment 110, while the second magnetic component 144 can be a metal that is magnetically attracted to a magnetic material, or vice versa. In another example, both the first magnetic component 142 and the second magnetic component 144 can be a magnetic material that are each oriented to have respective polarities so that the first magnetic component 142 and the second magnetic component 144 can magnetically couple with each other.

The first magnetic component 142 can be provided on a region of the first cover segment 110, while the second magnetic component 144 can be provided on the third panel 126. In some examples, when the panels 122, 124, 126 are pivoted and/or manipulated relative to the first cover segment 110 to form a first stable position for holding the first cover segment 110 upright at a first orientation or a second stable position for holding the first cover segment 110 upright at a second orientation, the first magnetic component 142 can align and magnetically couple with the second magnetic component 144. The magnetic coupling between the components 142, 144 can enable the cover 100 to be actively maintained in the first stable position or the second stable position. In variations, additional magnetic components can be provided on the third panel 126 and the first cover segment 110 to provide additional engaging features for maintaining the different stable positions of the cover 100.

The first cover segment 110 can also include an exterior surface 112 that has one or more raised regions or structures 128 provided on the exterior surface 112. In one example, when the cover 100 is positioned in the first stable position or the second stable position, the edge of the third panel 126 (e.g., the edge of the second cover segment 120) can abut and/or push against the raised structure 128. The edge of the third panel 126 can also abut or push against the raised structure 128 while the first magnetic connector 142 is magnetically engaged with or coupled to the second magnetic connector 144 of the third panel. In this manner, the raised structure 128 can assist to hold the first cover segment 110 upright in the first stable position or the second stable position.

The cover 100 can also include retention features or mechanisms for enabling a tablet computing device to be retained or held by the cover 100. The inner surface 130 can have a thickness, T1, and a recessed region 132 that is structured to receive a base of the tablet computing device. As an alternative or an addition, the three panels 122, 124, 126 can also have a thickness, T2, that is equal to or substantially similar to the thickness, T1, of the inner surface 130. The recessed region 132 can comprise three or more walls (e.g., four walls as seen in FIGS. 1A-1C) provided along the perimeter of the recessed region 132 for retaining a portion of the tablet computing device.

For example, the tablet computing device can have a housing with varying dimensions. In one implementation, the tablet computing device can have a housing with a base segment and a display segment. The recessed region 132 of the inner surface 130 can retain the base segment of the tablet computing device so that (1) the rear surface of the base segment rests in the recessed region 132, and (2) the rear surface of a portion of the display segment of the tablet computing device can rest of the inner surface 130.

The recessed region 132 can be in a shape similar to that of the base segment of the tablet computing device (e.g., circular, triangular, rectangular, rectangular with curved corners, etc.) so that the base segment can be inserted and fit snuggly into the recessed region 132. In this manner, the recessed region 132 can provide retention of the tablet computing device along two dimensions or axes. The first cover segment 110 can also include one or more openings 136 (e.g., within the recessed region 132 or within the inner surface 130) that can align with one or more features of the tablet computing device when the device is retained by the inner surface 130.

In some variations, the first cover segment 110 can also include a set of magnetic components 146 (e.g., one or more magnetic components) to enable the cover 100 to actively retain the tablet computing device when the base segment of the tablet computing device is provided in the recessed region 132. For example, one or more magnetic components 146 (e.g., magnets) can be provided with or embedded in the recessed region 132 to magnetically couple to the base segment of the tablet computing device, which includes one or more corresponding magnetic components (e.g., opposite polarity magnets, or metal that is attracted to magnetic materials) that align with the one or more magnetic components 146. As an alternative or addition, one or more magnetic components 146 can be provided with the inner surface 130 instead of the recessed region 132. In this manner, the magnetic coupling between the magnetic components 146 and the magnetic components of the tablet computing device can provide retention of the tablet computing device along one dimension or axis.

In some implementations, the cover 100 enables the retained tablet computing device to be shielded and protected from the environment when the second cover segment 120 is positioned to overlay the display surface of the device. In addition, the cover 100 actively retains the tablet computing device and enables a user to easily place the cover 100 in different stable positions for more efficient usage of tablet computing device.

Figure 2A:
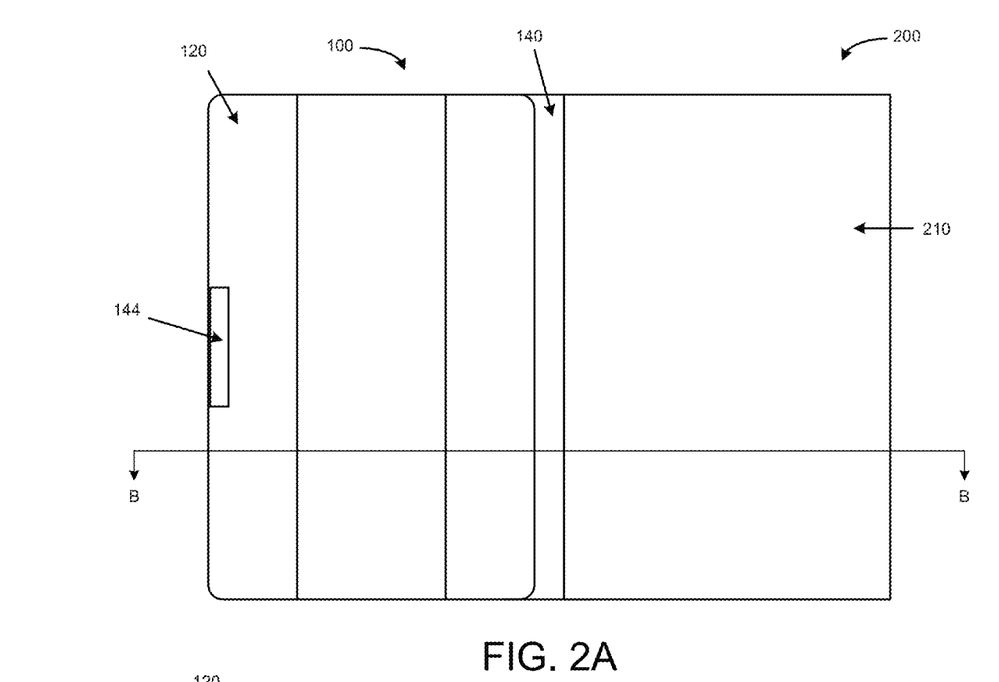
FIGS. 2A-2E illustrate an example cover and tablet computing device assembly.
Figure 2B:
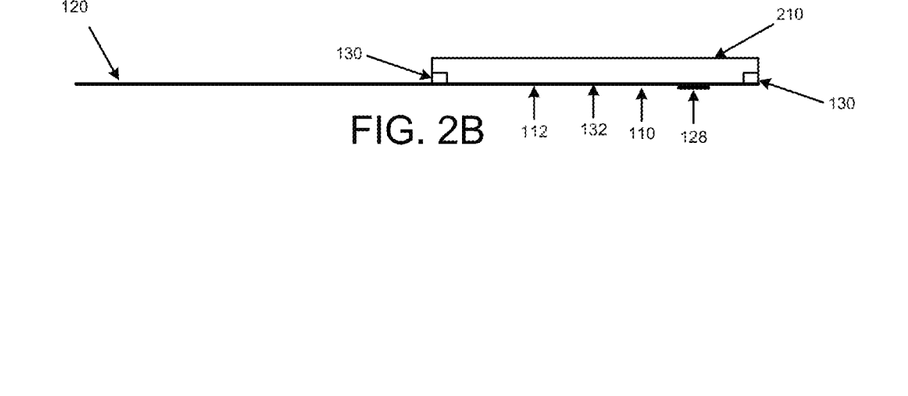
Figure 2C:
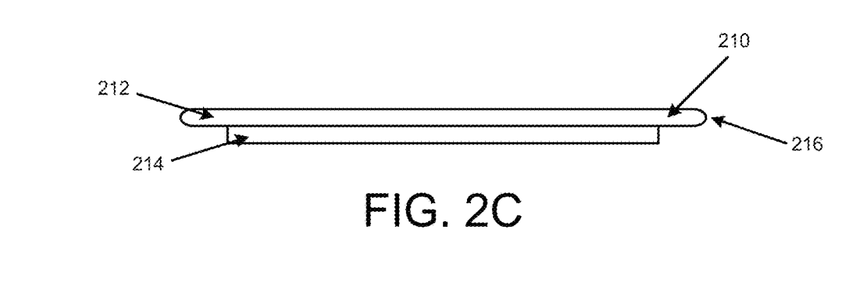

FIGS. 2A-2E illustrate an example cover and tablet computing device assembly. More specifically, the FIG. 2A illustrates a cover and tablet computing device assembly 200 that includes a cover 100 in an open position (e.g., where the second cover segment 120 does not overlaying or overlapping the display surface of the tablet computing device 210). FIG. 2B illustrates an example cross sectional view of the cover and device assembly 200 about the line B-B. FIG. 2C illustrates an example of a tablet computing device that can be retained by the cover 100 in the cover and tablet computing device assembly 200.

In one example, the cover and device assembly 200 includes a tablet computing device 210 that is retained by and engaged with the first cover segment 110 of the cover 100 (e.g., the cover as described in FIGS. 1A-1C). The first and second cover segments 110, 120 can form a binder-style case for the tablet computing device 210.

As illustrated by examples of FIGS. 2A-2E, a portion of the housing of the tablet computing device 210 can be retained by the inner surface 130 and the recessed region 132. For example, the tablet computing device 120 can have a housing with a display segment 212 (e.g., where the display surface is provided) and a base segment 214 (see FIG. 2C). The tablet computing device can have an overall thickness (e.g., the thickness of the display segment 212 and the base segment 214 combined), and two separate peripheral thicknesses of the different segments. Based on different implementations, the inner surface 130 can have a thickness to retain at least a portion of the base segment 214. For example, the base segment 214 can be larger in thickness than the thickness of the inner surface 130. In some variations, the peripheral thickness of the base segment 214 can be equal or substantially similar to the thickness, T1, of the inner surface 130. The tablet computing device 120 can also include one or more features 216 that are provided on one or more sides of the display segment 212.

The base segment 214 of the tablet computing device 210 can be inserted into the recessed region 132 of the first cover segment 110 and retained by walls of the recessed region 132 (e.g., in implementations where the recessed region 132 is in the shape of a circle, triangle, hexagon, etc., different number of walls of the recessed region 132 can retain the base segment 214). In this manner, when the tablet computing device 210 is retained by the cover 100, the base segment 214 is retained by the recessed region 132 while, at the same time, the rear surface of the display segment 212 of the tablet computing device 210 can rest on the upper surface 130.

Figure 2D:
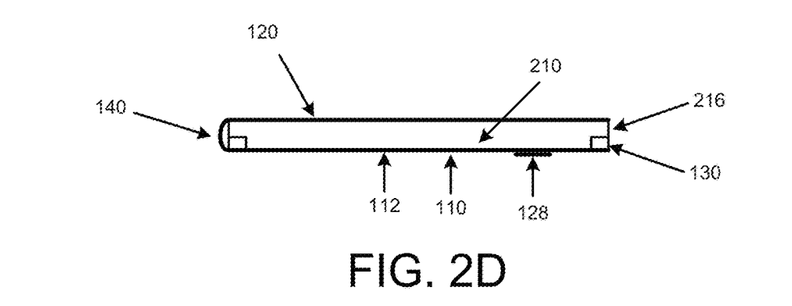
Figure 2E:
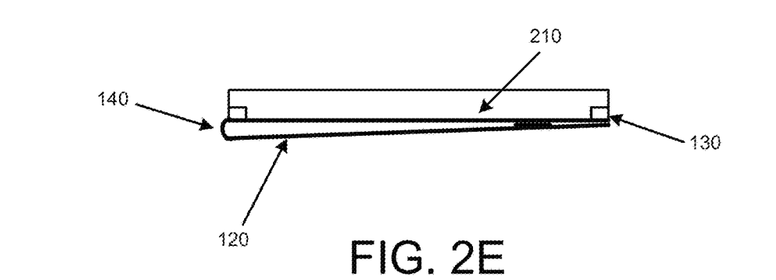

In addition, when the tablet computing device 210 is retained by the cover 100, the peripheral thickness of the display segment 212 can be exposed to the user so that one or more features 216 of the tablet computing device 210 can be exposed/accessible by a user even when the cover 100 is in a closed position (e.g., when the second cover segment 120 overlays the tablet computing device 210), as illustrated in FIG. 2D, or in an open position with the second cover segment 120 being tucked beneath the first cover segment 110, as illustrated in FIG. 2E. For example, in either cover position, features such as a power button, volume buttons, speaker ports, communication ports (e.g., USB or micro-USB ports), headphone jacks, etc., can be exposed on one or more sides of the display segment 212.

A set of magnetic components that are provided with the first cover segment 110 can also magnetically couple to the base segment 214 of the tablet computing device 210 to provide additional retention of the tablet computing device 210 by the cover 100. The structure of the first cover segment 110 and the set of magnetic components enable the tablet computing device 210 to be retained by the cover 100. However, in some variations, the retention mechanisms can also enable a user to easily and quickly detach the tablet computing device 210 from the cover 100 by grabbing the exposed display segment 212 of the tablet computing device 210.

In one example, a magnetic component, such as the second magnetic component 144 of the second cover segment 120 (e.g., of the third panel, as discussed with respect to FIGS. 1A-1C), can also provide a mechanism for magnetically coupling the second cover segment 120 to the tablet computing device 210 when the tablet computing device 210 is actively retained by the first cover segment 110 of the cover 100. For example, as illustrated in FIG. 2D, the second cover segment 120 can overlay the tablet computing device 210. The second magnetic component 144, which is provided on the second cover segment 120 (e.g., near the edge of the second cover segment 120) as illustrated in FIG. 2A, can magnetically couple to a portion of the display segment 212 to enable the cover 100 to remain in a closed position. Similarly, the first cover segment 110 can include additional magnetic components to enable the second cover segment 120 to remain tucked beneath the first cover segment 110, as illustrated in FIG. 2E.

Figure 3A:
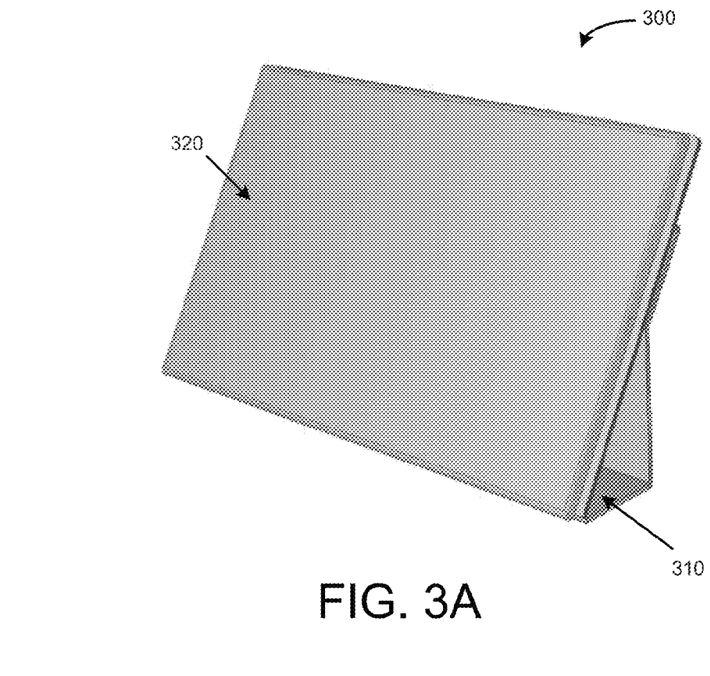
FIGS. 3A-3B illustrate an example cover and tablet computing device assembly in different stable positions.
Figure 3B:
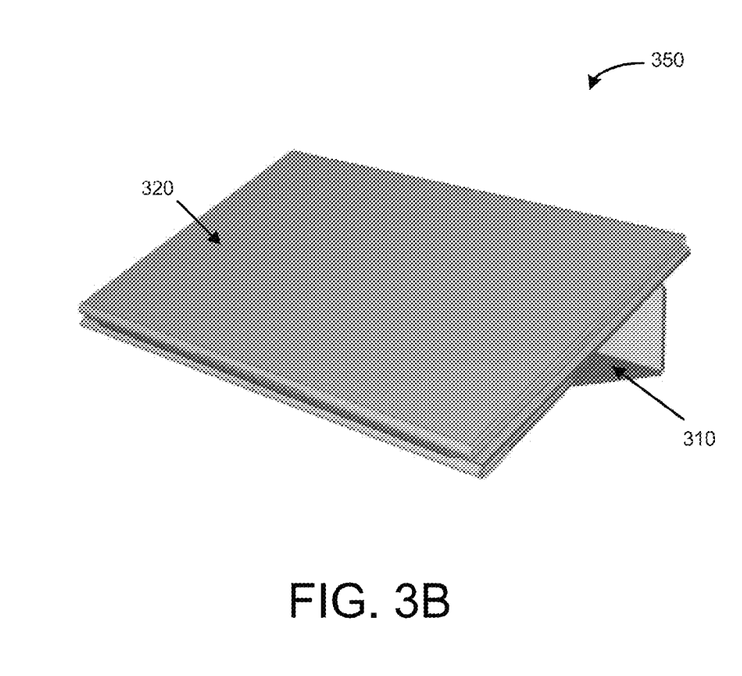

FIGS. 3A-3B illustrate an example cover and tablet computing device assembly in different stable positions. In FIG. 3A, the cover and tablet computing device assembly is positioned in a first stable position 300 for holding the first cover segment (as well as the retained tablet computing device 320) upright at a first orientation. The first stable position 300 can correspond to a display mode position for the cover 310, in which the tablet computing device 320 is positioned for better viewing (e.g., compared to the tablet computing device 320 lying flat down on a surface or compared to the user having to hold the device up). The cover 310 can maintain the first stable position 300 even though a user operates the device or applies pressure or force to the retained tablet computing device 320.

In FIG. 3B, the cover and tablet computing device assembly is positioned in a second stable position 350 for holding the first cover segment upright at a second orientation. In one example, the second stable position 350 can correspond to a typing mode position for the cover 310, in which the tablet computing device 320 is positioned to enable a user to type on a displayed keyboard (or interact with the touch-sensitive display) of the tablet computing device 320. The cover 310 can maintain the second stable position 350 even though a user operates the device or applies pressure or force to the retained tablet computing device 320.

In some variations, the cover 310 can be positioned in the first stable position 300 or in the second stable position 350 to retain the device in a landscape orientation, as illustrated in FIGS. 3A and 3B (from the perspective of the user), or in a portrait orientation. In either scenario, the cover 310 can be switched between the first stable position 300 and the second stable position 350, for example, without having the user change the orientation of the cover 310 that is resting on a surface or re-orient the device. The user can manipulate the three panels of the second cover segment to switch from the first stable position 300 to the second stable position 350 or vice versa, while at the same time, maintaining the same orientation of the tablet computing device 320 (e.g., with the display surface facing in the same direction toward the user).

Figure 4A:
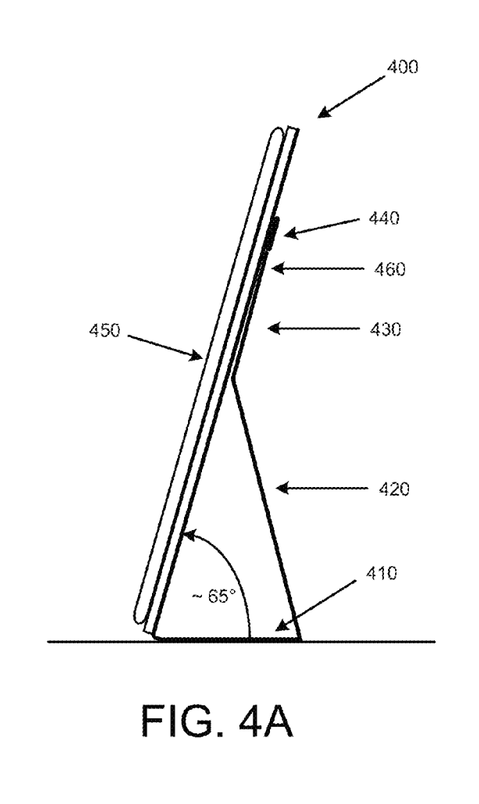
FIGS. 4A-4C illustrate an example cover and tablet computing device assembly in different stable positions in a different view.
Figure 4B:
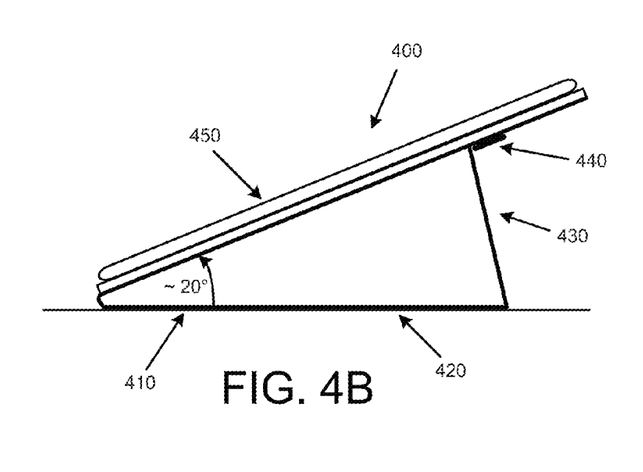
Figure 4C:
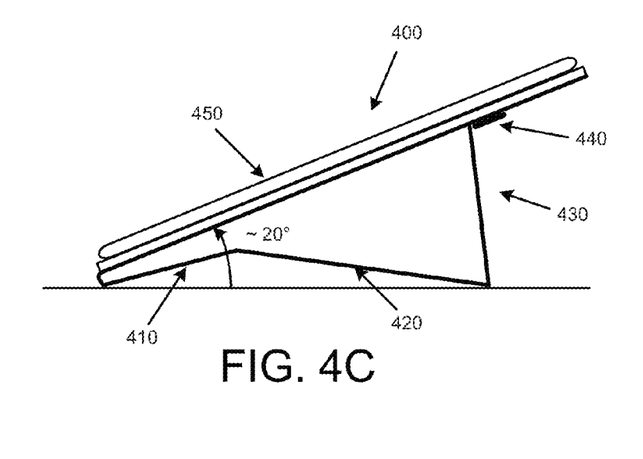

FIGS. 4A-4C illustrate an example cover and tablet computing device assembly in different stable positions in a different view. FIG. 4A illustrates a cover and device assembly 400 that is in a first stable position for holding the first cover segment (as well as the retained tablet computing device 450) upright at a first orientation. In the first stable position, e.g., a hands-free display mode position, the first cover segment is positioned upright at around 65 degrees relative to a surface that the cover and device assembly 400 is placed on. The three panels, 410, 420, 430 can be pivoted in different directions relative to each other in to form the first stable position.

The second cover segment (e.g., as described with respect to FIGS. 1A-2E) can include a first panel 410, a second panel 420, and a third panel 430, in one implementation. The three panels 410, 420, 430 are pivotable relative to the first cover segment to form the first stable position. For example, the first panel 410 can be positioned around 65 degrees (e.g., between 50-80 degrees depending on variations of panels with different sizes) relative to the exterior surface of the first cover segment, so that the first panel 410 provides a base for first stable position. The second panel 420 can be pivoted relative to the first panel 410 to provide support for first cover segment (e.g., which, due to its weight and weight of the tablet computing device 450, would tend to fall backwards), while the third panel 430 can be pivoted relative to the second panel 420, in order to maintain the cover in the first stable position.

In some variations, the third panel 430 can include one or more magnetic components 460 that can magnetically couple to a magnet or to a metal that is attracted to a magnet that is provided in the first cover segment. The magnetic component 460 can actively maintain the first stable position by enabling the third panel 430 to remain in the proper position with respect to the first cover segment. In addition, because of the magnetic attractive force created between the third panel 430 and the first cover segment, a user can easily determine where to position the third panel segment 430 against the exterior surface of the first cover segment to place and maintain the cover in the first stable position.

The exterior surface of the first cover segment also includes one or more raised regions or structures 440 that support the third panel 430. For example, as illustrated in FIGS. 1A-1C, a first magnetic component can be provided with the first cover segment, and a second magnetic component that is attracted to the first magnetic component can be provided near the edge of the third panel 430. When the third panel 430 is positioned in the manner illustrated in FIG. 4A to place the cover in the first stable position, the first and second magnetic components can align and magnetically couple to each other to place the third panel 430 in the proper position, and the edge of the third panel 430 can abut or push against the raised structure 440. In this manner, the raised structure 440 can actively maintain the first stable position of the cover and device assembly 400.

In FIGS. 4B and 4C, the cover and device assembly 400 is shown in a second stable position for holding the first cover segment (as well as the retained tablet computing device 450) upright at a second orientation. In the second stable position, e.g., a typing mode or input entry mode position, the first cover segment is positioned upright at around 20 degrees relative to a surface that the cover and device assembly 400 is placed on. The three panels, 410, 420, 430 can be pivoted in different directions relative to each other in to form the second stable position.

As an example, in the second stable position, the first panel 410 can be positioned around 20 degrees (e.g., between 10-30 degrees depending on variations of panels with different sizes) relative to the exterior surface of the first cover segment, so that the first panel 410 and the second panel 420 provides a base for first stable position (e.g., as seen in FIG. 4B). In one variation, the first panel 410 and the second panel 420 can be pivoted relative to each other and to the first cover segment (e.g., as seen in FIG. 4C) so that the first panel 410 is closer to the exterior surface of the first cover segment. In either implementation, the third panel 430 can be pivoted relative to the second panel 420, in order to maintain the cover in the second stable position. In addition, the edge of the third panel 430 can abut or push against the raised structure 440 so that the cover can be actively maintained in the second stable position.

Figure 5:
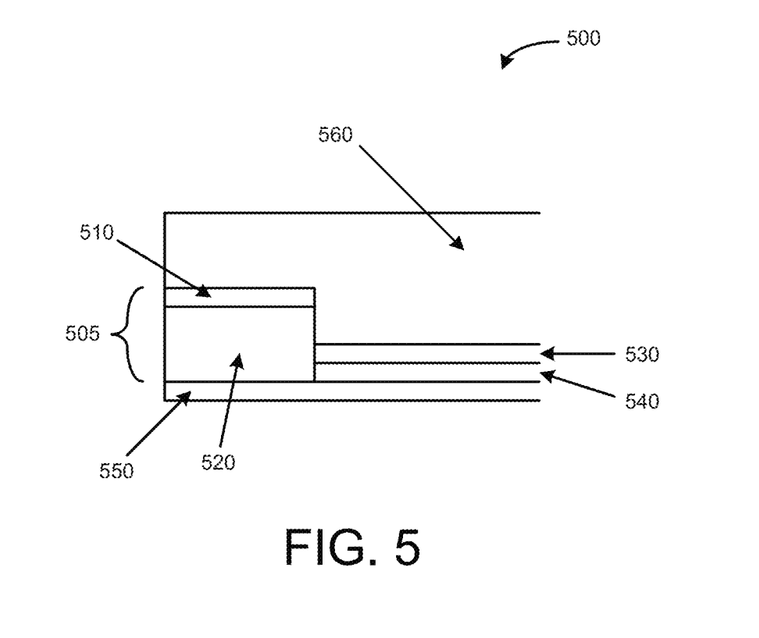
FIG. 5 illustrates an example layered view of a cover for a tablet computing device.

FIG. 5 illustrates an example layered view of a cover for a tablet computing device. The layered view 500 illustrates an example of the first cover segment, as described with FIGS. 1A-4C, with a tablet computing device 560 that is retained by the cover. For example, the combination 505 of some of the layers illustrated in FIG. 5 can form the inner surface of the cover (e.g., the inner surface 130 as described in FIGS. 1A-2D). In another example, the inner surface 130, as described in FIGS. 1A-2D, can be formed from layers 510, 530 and a portion of layer 520.

The first cover segment can include an inner layer 510, such as microfiber, leather, cloth, fabric, or other flexible material, and a frame or inner surface layer 520 that forms the inner surface with a recessed region, as described in FIGS. 1A-4C. The frame or inner surface layer 520 can be made of a glass fiber or carbon fiber material, a metal, a rigid material, or a less rigid material, such as a urethane foam sheet or polyurethane. The tablet computing device 560 can be retained by the recessed region created by the frame layer 520, so that a rear face of the display segment of the device 560 can rest on the inner surface (e.g., on the inner layer 510) thereby enabling the peripheral thickness of the display segment to be exposed.

The first cover segment can also include recessed pocket layer 530, which can also be made of microfiber, leather, cloth, fabric, or other flexible material. In some examples, the inner layer 510 and the recessed pocket layer 530 can be a continuous layer. Underneath the recessed pocket layer 530, a stiff cover layer 540 is provided to form a rigid structure for the first cover segment. The stiff cover layer 540 can be made of a carbon fiber, or metal, such as steel, to provide a support for keeping the shape and form of the cover, as well as to provide a support for retaining the tablet computing device 560.

According to some examples, the stiff cover layer 540 can also provide the magnetic components as discussed with FIGS. 1A-4C. For example, if the stiff cover layer 540 was made from a carbon fiber material, one or more magnetic components (e.g., magnets, or metal attracted to magnets) can be provided with the stiff cover layer 540. On the other hand, if the stiff cover layer 540 was made from steel, for example, no additional magnetic components may be necessary (e.g., the tablet computing device 560 can include one or more magnets to magnetically couple to the steel layer). The first cover segment can also include an outer layer 550, which can also be made of microfiber, leather, cloth, fabric, or other flexible material. The layers described in the layer view 500 can be adjoined, laminated, or bonded together using adhesives or glue.

In some variations, the inner layer 510 and the outer layer 550 can be adjoined together at the sides of the first cover segment (e.g., can form the center portion 140 that can be a portion of either the first cover segment 110 and/or the second cover segment 120, as described with FIGS. 1A-1C), and/or can be extended out to form the inner layer and outer layer of the second cover segment. For example, the second cover segment can include panels that have layers as described in FIG. 5 (e.g., an inner layer, a frame layer, a stiff cover layer, and/or an outer layer).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A computing device accessory comprising:
    a first cover segment including an inner surface and an exterior surface, the inner surface including a recessed region to receive a base of a tablet computing device;
    a second cover segment extended from the first cover segment, the first and second cover segment forming a binder-style case for the tablet computing device, the second cover segment including a plurality of foldable panels; and
    a magnetic component provided with the first cover segment, the magnetic component being positioned to actively retain the tablet computing device when the base of the tablet computing device is received in the recessed region;
    wherein the exterior surface of the first cover segment includes a raised structure, and
    wherein an edge of one of the plurality of foldable panels is configured to abut the raised structure in one or more stable positions.

2. The computing device accessory of claim 1, wherein the magnetic component is embedded in the first cover segment.

3. The computing device accessory of claim 1, wherein the magnetic component is a magnet.

4. The computing device accessory of claim 1, wherein the inner surface of the first cover segment is formed of at least one of a glass fiber material or carbon fiber material.

5. The computing device accessory of claim 1, wherein the first cover segment includes one or more openings positioned to align with one or more features of the tablet computing device.

6. A covered tablet computing device assembly comprising:
    a first cover segment including an inner surface and an exterior surface, the inner surface including a recessed region;
    a second cover segment extended from the first cover segment, the first and second cover segment forming a binder-style case for the tablet computing device, the second cover segment including a plurality of foldable panels; and
    a tablet computing device including a base segment and a display segment;
    wherein the base segment is retained in the recessed region of the inner surface, and
    wherein the display segment is dimensioned to rest on the inner surface so that a peripheral thickness of the display segment is exposed; and
    wherein the exterior surface of the first cover segment includes a raised structure, and
    wherein an edge of one of the plurality of foldable panels is configured to abut the raised structure in one or more stable positions.

7. The covered tablet computing device assembly of claim 6, further comprising a set of magnetic components, including a first magnetic component provided with the first cover segment to retain the tablet computing device when the base segment is retained in the recessed region.

8. The covered tablet computing device assembly of Claim 7, wherein the first magnetic component is a magnet.

9. The covered tablet computing device assembly of claim 8, wherein the first magnetic component magnetically couples to a rear face of the base segment when the base segment is retained in the recessed region.

10. The covered tablet computing device assembly of claim 6, wherein the tablet computing device includes a set of features on the peripheral thickness which are accessible when the base segment is retained in the recessed region.

11. A cover for a tablet computing device comprising:
    a first cover segment including an inner surface and an exterior surface, the inner surface including a recessed region to receive a base of the tablet computing device the recessed region providing at least three walls;
    a second cover segment extended from the first cover segment, the first and second cover segment forming a binder-style case for the tablet computing device, the second cover segment including a plurality of foldable panels; and
    a set of magnetic components provided with the first cover segment, the set of magnetic components being positioned to actively retain the tablet computing device when the base of the tablet computing device is received in the recessed region;
    wherein the exterior surface of the first cover segment includes a raised structure, and
    wherein an edge of one of the plurality of foldable panels is configured to abut the raised structure in one or more stable positions.

12. The cover of claim 11, wherein the set of magnetic components are embedded with the first cover segment.

13. The cover of claim 11, wherein the set of magnetic components includes a set of magnets.

14. The cover of claim 11, wherein the inner surface of the first cover segment is formed of at least one of a glass fiber material or carbon fiber material.

15. The cover of Claim 11, wherein the first cover segment includes one or more openings positioned to align with one or more features of the tablet computing device.

16. The covered tablet computing device assembly of claim 10, wherein the first cover segment includes one or more openings positioned to align with one or more of the set of features of the tablet computing device.

* * * * *